Sept. 30, 1958        G. RAISBECK        2,854,191

COMPUTATION OF CORRELATION

Filed Nov. 23, 1953        4 Sheets-Sheet 1

INVENTOR
G. RAISBECK
BY Harry C. Hart
ATTORNEY

Sept. 30, 1958    G. RAISBECK    2,854,191
COMPUTATION OF CORRELATION

Filed Nov. 23, 1953    4 Sheets-Sheet 2

INVENTOR
G. RAISBECK
BY Harry C. Hart
ATTORNEY

Sept. 30, 1958             G. RAISBECK             2,854,191

COMPUTATION OF CORRELATION

Filed Nov. 23, 1953                                      4 Sheets-Sheet 3

INVENTOR
G. RAISBECK
BY
Harry C. Hart
ATTORNEY

Sept. 30, 1958   G. RAISBECK   2,854,191
COMPUTATION OF CORRELATION
Filed Nov. 23, 1953   4 Sheets-Sheet 4

INVENTOR
G. RAISBECK
BY
Harry C. Hart
ATTORNEY

United States Patent Office 2,854,191
Patented Sept. 30, 1958

2,854,191

COMPUTATION OF CORRELATION

Gordon Raisbeck, Basking Ridge, N. J., assignor to Bell Telephone Laboratories, Incorporated, New York, N. Y., a corporation of New York Application November 23, 1953, Serial No. 393,909

16 Claims. (Cl. 235—61)

This invention relates to computing devices and especially to a method and means for the instrumental computation of correlation functions.

The correlation functions with which the present invention is concerned are defined in general by the following equation:

$$\varphi_{12}(\tau) = \lim_{T \to \infty} \frac{1}{T} \int_{-T/2}^{T/2} f_1(t) \cdot f_2(t-\tau) dt \quad (1)$$

In the foregoing equation $f_1(t)$ and $f_2(t)$ may be different functions of time, in which case it defines the cross correlation between them. On the other hand, they may be identical, in which case the foregoing equation reduces to $$\varphi_{11}(t) = \lim_{T \to \infty} \frac{1}{T} \int_{-T/2}^{T/2} f_1(t) \cdot f_1(t-\tau) dt \quad (2)$$

which defines the so-called autocorrelation of the function $f_1(t)$. In either case, the left-hand side of the equation is a function of $\tau$ only since $t$ is eliminated by the process of integration.

The foregoing expressions define the correlation only for the limiting case in which T, the period over which the integration is taken, approaches infinity. In practice, however, interesting and valuable results are obtained in which T, while large compared with $\tau$, is finite. That is to say, it is of advantage to define a "short term" cross correlation $\psi_{12}(t,\tau)$ and a "short term" autocorrelation $\psi_{11}(t,\tau)$ respectively, as $$\psi_{12}(t,\tau) = \frac{1}{T} \int_{t-T}^{t} f_1(t) \cdot f_2(t-\tau) dt \quad (3)$$

and $$\psi_{11}(t,\tau) = \frac{1}{T} \int_{t-T}^{t} f_1(t) \cdot f_1(t-\tau) dt \quad (4)$$

Evidently the quantity $\psi_{12}(t,\tau)$ is a function of the time $t$, as well as the lag $\tau$, and so varies as time progresses. However, at any instant $t$, it is a good approximation to $\psi_{12}(\tau)$, provided only that $T \gg \tau$. To the same extent, and within the same restriction, $\psi_{11}(t)$ is a good approximation to $\varphi_{11}(t)$.

In the Expressions 1 and 2, the period of integration commences in the past and extends into the future. It is of course impossible to instrument this entire integration process with physical means. Therefore, in the Expressions 3 and 4, the integration is stated to commence in the past and to extend to the present. The integrals as thus changed are now physically realizable, though the change in form involves no change in their values.

The computation of correlation is of chief interest in the field of communications when the correlation (autocorrelation or cross correlation as the case may be) for one value of the lag $\tau$ is compared with that for other values of the lag $\tau$. To effect such a comparison continuously and on a running basis as the signals whose correlation is being determined progress, it becomes necessary to compute the correlation for each of a large number of values of the lag $\tau$ with great rapidity. The result of the computation may then be plotted as a running graphical function of time which serves to reveal features of the signals $f_1(t)$ and $f_2(t)$ which are otherwise obscured.

As a practical matter this rapid and repeated computation of the correlation requires the introduction into one of the two signals of a variable lag $\tau$, the multiplication together of the signals for each value of $\tau$, the integration or averaging of the product over the time T, and the repetition of these steps for the next value of $\tau$ and so on.

When this process is instrumented for rapid electrical or mechanical computation, the variable lag may conveniently be introduced by the employment of a retardation device such as a delay line whose effective length is varied by the lengthwise movement of a tap which makes contact with the line. A system of this character is disclosed, for example, in an article by W. R. Bennett published in the Bell System Technical Journal for September, 1953, vol. 32, page 1173.

However, with physically realizable components, the delay line inevitably introduces an undesired attenuation as well as the desired lag. This attenuation depends on the effective length of the line and therefore varies as the line length varies. In addition, it may depend on frequency. While it can in principle be compensated by the employment of a suitably designed attenuator connected in tandem with the moving tap, the design of such an attenuator may under some circumstances present substantial difficulties. Even aside from this, such a solution is awkward and expensive.

The present invention provides complete compensation for the undesired attenuation which attends the use of a variable retardation device such as a delay line, whether it be a function of the effective length of the line alone or a function also of frequency, temperature, time, or any combination of these. This is accomplished, in accordance with the invention, by the employment of two like delay lines in place of one, the location, in the course of its movement, of the tap of each with respect to its input point, which determines the effective length of the line, being complementary to that of the other. With appropriate circuit connections from the taps to the conventional elements of a correlation computer, all variation of attenuation is caused to disappear from the output while the variation of the desired lag is retained. In one form the lines are terminated for no reflection and the taps are located and moved in such a way that the sum of the length of one line from its input point to its tap plus the length of the other line from its input point to its tap is a constant; e. g., the taps of the two lines are moved in opposite senses with respect to the input points of the lines. In a second form the lines are terminated for reflection with and without phase reversal, respectively, and the taps are located and moved always in the same sense with respect to the input points of the lines. In still another form, two lines are employed, the sum of whose effective lengths is a constant but, by a novel switching arrangement, the unused portion of each of the lines of the first form becomes, in this third form, the useful portion of the other line, with a consequent economy in the total length of line which must be made available.

The invention will be fully apprehended from the following detailed description of preferred embodiments thereof, taken in connection with the appended drawings, in which.

Figure 1:
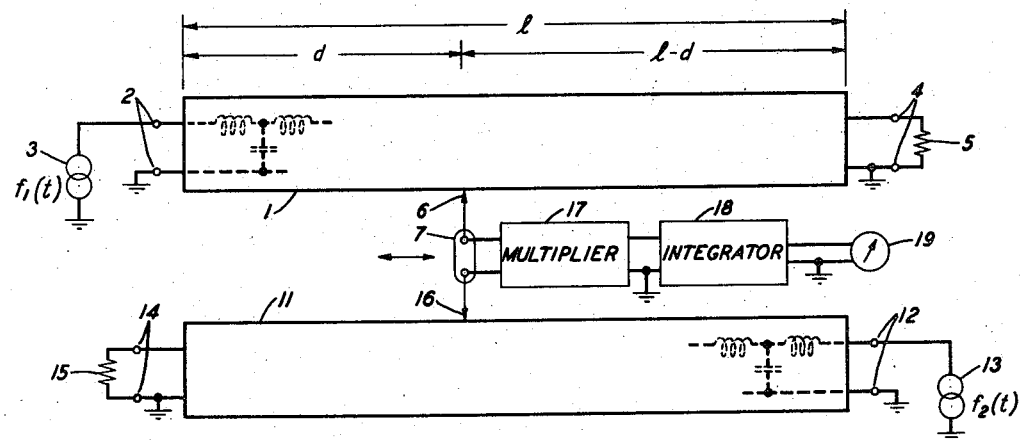
Fig. 1 is a schematic diagram showing a cross correlation computer in accordance with the invention.

Referring now to the drawings, Fig. 1 shows a retardation device or delay line 1 of length $l$ having input terminals 2 to which a generator 3 is connected and output terminals 4 to which is connected a resistor 5 whose impedance is equal to the characteristic impedance of the line 1. This resistor 5 absorbs the wave energy which reaches it and thus prevents the generation of a reflected wave which would otherwise be propagated along the line in the reverse direction. The delay line 1 itself may be of any desired sort, the requirements being only that a signal applied to its input terminals 2 shall be propagated at a speed $v$, preferably uniform, toward and ultimately to the output terminals 4 without excessive dispersion and without excessive attenuation, and that this signal, or a secondary signal proportional to it, may be picked off by a tap 6 which may be located at any point along the length of the line 1 and moved freely to any other point. The propagated wave may be electromagnetic, acoustic, mechanical, magneto-strictive, or of any other variety. Delay lines of various sorts, any of which may be adapted to the present purposes, are shown in British Patent 174,355. For many purposes a convenient structure is a ladder network of like reactive sections, each of which comprises an inductance coil connected in series and a capacitor connected in shunt. In such a line the reactances are of the so-called "lumped" variety and selectable taps are connected to the terminals of each of the several sections. Such a line is disclosed in the aforementioned publication of W. R. Bennett.

If the signal applied at the input terminals 2 of the line 1 by the generator 3 be denoted $f_1(t)$, it is propagated down the line from the input terminals to the output terminals 4. In doing so, it passes the tap 6 where a derived signal is picked off. If the location of the tap 6 with respect to the input terminals 2 of the line be denoted $d$, then the signal picked off at the tap has the form $$e^{-\alpha d} f_1\left(t - \frac{d}{v}\right) \qquad (5)$$

where $\alpha$ is the attenuation factor per unit length of the line and $v$ is the propagation speed of the signal along the line. The absorptive terminating impedance 5 prevents reflection from taking place at the output terminals of the line so that this signal is not followed by any image or echo.

A second line 11 is provided having input terminals 12 to which a generator 13 is connected and output terminals 14 to which there is connected a resistor 15 whose impedance is equal to the characteristic impedance of the line as before to provide virtually complete absorption of any signal reaching it and so prevent reflection. The line 11 should have the same propagation speed, dispersion, and attenuation as the line 1. Therefore, as a matter of convenience, it preferably has the same structure also, since the provision of like structures ensures like behavior. In particular its length $l$ is the same as that of the line 1. Like the first line 1, this second line 11 is provided with a movable tap 16 and, in accordance with the invention, the two taps 6, 16 are mechanically coupled together for movement from end to end of the pair of lines as by mounting them on a common mechanical support 7. When, as indicated above, the tap 6 of the first line is located at a distance $d$ from its input terminals 2, then with this arrangement the tap 16 of the second line 11 is located at a distance $l-d$ from its input terminals 12. If, now, the signal applied to the input terminals 12 of the second line 11 by the generator 13 is denoted $f_2(t)$, it travels along the line 11 toward the absorptive termination 15 in the direction here illustrated as from right to left. As it passes the movable tap 16, the latter picks off a derived signal which is given by $$e^{-\alpha(l-d)} f_2\left(t - \frac{l-d}{v}\right) \qquad (6)$$

The absorptive terminating impedance element 15 prevents reflection from taking place at the output terminals 14 of the line 11 so that this signal is not followed by any image or echo.

The two signals thus picked off the respective lines are applied to the two input terminals of a multiplier 17 which multiplies them together to form a product. This product, appearing at the output terminals of the multiplier, is applied to an integrator 18 which is proportioned to integrate, or average, this product over a desired time T and deliver the integral to an indicator 19.

Figure 2:
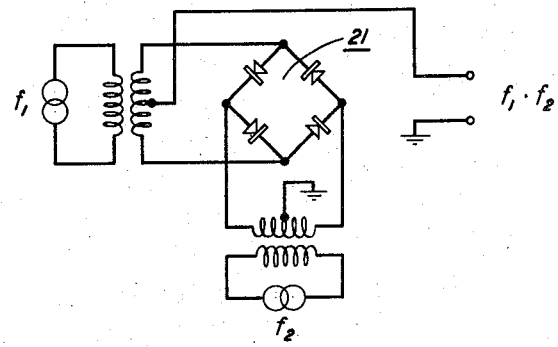
Fig. 2 is a schematic circuit diagram showing a multiplier which may be employed in the system of Figs. 1 and 2.

The multiplier 17 may be a circuit element or combination of elements which accepts as two separate inputs the factors to be multiplied together and delivers an output proportional to their product. It may have any desired construction, for example, a modulator combined with a filter which eliminates undesired cross products. Fig. 2 shows a multiplier which is preferred for the reason that it minimizes the selectivity requirements placed on the filter. It comprises a ring or square 21 of four varistors, the anode of each being connected to the cathode of the next, the first factor being applied across one diagonal of the square and the second factor across the other diagonal as in the case of a bridge, while the output is taken between the midpoints of the input windings. By the employment of means such as batteries, not shown, each varistor may be operated under bias conditions such that its characteristic approximates a square law curve. As is well known, if A and B represent the two inputs, this arrangement in principle adds them together and squares the sum, subtracts one from the other and squares the difference, and finally subtracts the square of the difference from the square of the sum to give a factor proportional to the product. Thus $$(A+B)^2 - (A-B)^2 = 4AB \qquad (7)$$

Figure 3:
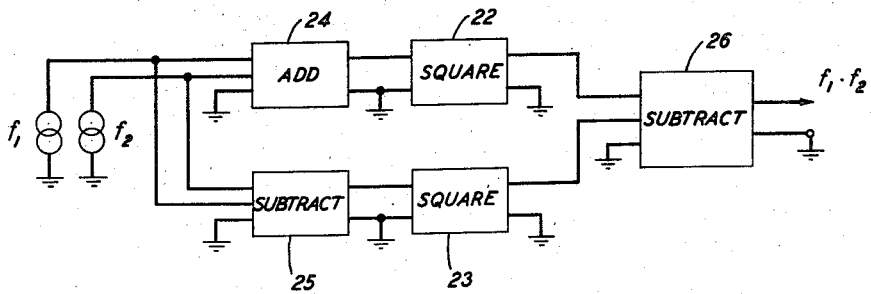
Fig. 3 is a schematic block diagram showing an alternative multiplier.
Figure 4:
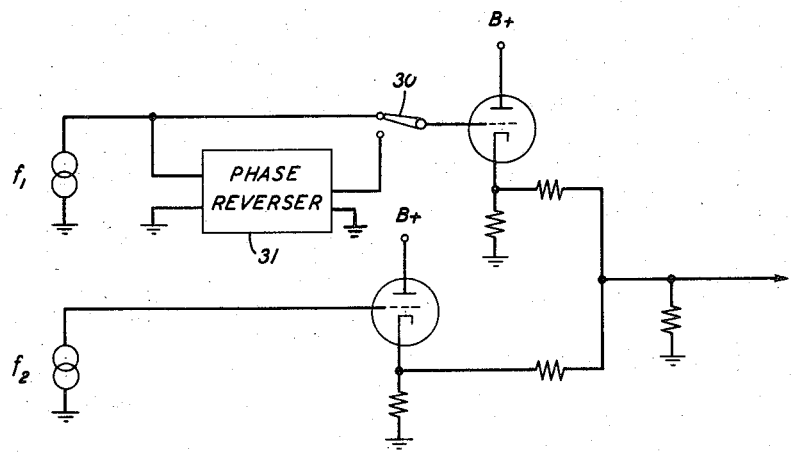
Fig. 4 is a schematic circuit diagram showing an adder and a subtracter which may be employed in the multiplier of Fig. 3.

If preferred, the individual operations, here indicated in Equation 7 as being together performed by the modulator of Fig. 2, may be individually performed by appropriate apparatus elements interconnected as shown in Fig. 3. Here, each squarer 22, 23 may be any device whose input-output characteristic follows a square law. The adder 24 may have the form shown in Fig. 4, with the switch 30 in the "up" position. When the switch 30 is thrown to the "down" position, an inverter 31 is included to reverse the phase of one of the two input signals, thus in effect changing the sign of one of the two terms to be added together. Each of the subtracters 25, 26 of Fig. 3 may have this construction.

The integrator 18 (Fig. 1) may comprise a simple combination of a resistor connected in series and a condenser connected in shunt. As is well known, this combination effectively carries out an integration or averaging process with respect to time of any time function applied to its input terminals, the integration limits being approximately $-T$ and zero where $T=RC$, R and C standing for the resistance of the resistor in ohms and the capacitance of the condenser in farads.

Returning to the expressions given above for the signals derived at the moving taps 6, 16, it is easily seen that upon multiplying these two expressions together, the attenuation factor $e^{-\alpha d}$ is balanced by the attenuation factor $e^{-\alpha(l-d)}$, leaving as the product $$4e^{-\alpha l}f_1\left(t-\frac{d}{v}\right)\cdot f_2\left(t-\frac{l-d}{v}\right) \quad (8)$$

wherein the retardations introduced into the signal $f_1$ by the first line and into the signal $f_2$ by the second line have been preserved, and wherein the factor "4" arises from the use of a quarter-square multiplier, e. g., that of Fig. 2 or Fig. 3, as indicated in Equation 7. The time average of this quantity is $$\frac{1}{T}\int_{t-T}^{t} 4e^{-\alpha l}f_1\left(t-\frac{d}{v}\right)\cdot f_2\left(t-\frac{l-d}{v}\right)dt \quad (9)$$

$$=\frac{4e^{-\alpha l}}{T}\int_{t-T}^{t} f_1\left(t-\frac{d}{v}\right)\cdot f_2\left(t-\frac{l-d}{v}\right)dt \quad (10)$$

From this expression it is apparent that the variation in attenuation with tap position has vanished and been replaced by a constant multiplier $4e^{-\alpha l}$ which is of no practical significance. Moreover, the dependence of the attenuation factor on tap displacement has vanished even though it may be a function of frequency as well as of tap displacement.

Any dependence of the attenuation factor $\alpha$ on frequency is represented exclusively in this constant multiplier $4e^{-\alpha l}$. Insofar as it is of importance, it may be completely compensated by the employment of a static equalizer of conventional construction in tandem with the correlation computer as a whole.

Moreover, if the substitutions $$t'=t-\frac{d}{v} \quad (11a)$$

$$\tau'=\frac{l-2d}{v} \quad (11b)$$

are made in the above integral (10), it reduces to $$\int_{t'+\frac{d}{v}-T}^{t'+\frac{d}{v}} f_1(t')\cdot f_2(t'-\tau')dt' \quad (12)$$

With the exception of the term $$\frac{d}{v}$$

in both integration limits, which is of no significance, this integral is of the same form as that of Equation 3 and therefore measures the short-term correlation between the signals $f_1$ and $f_2$.

Figure 5:
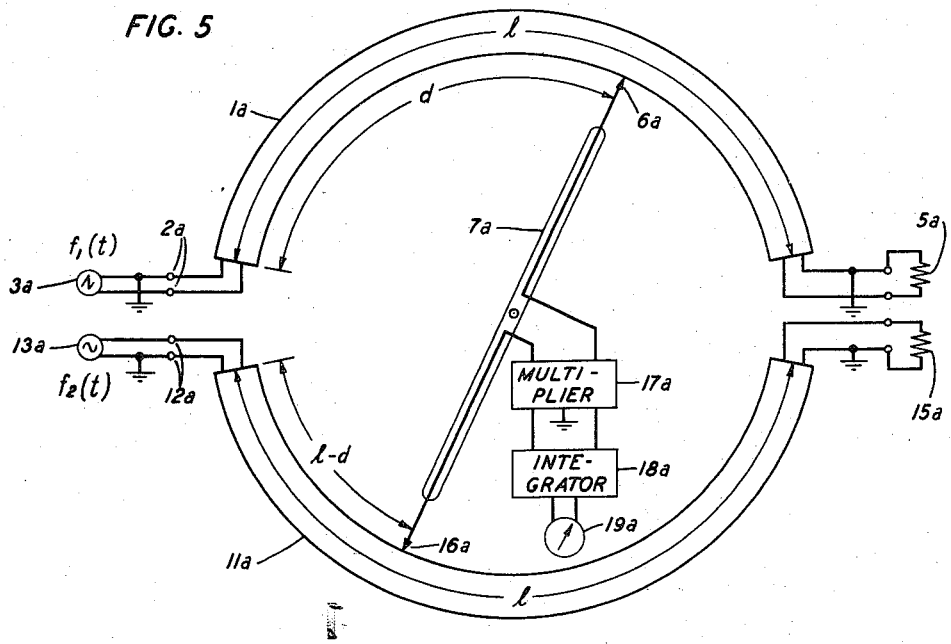
Fig. 5 is a schematic block diagram showing the apparatus of Fig. 1 rearranged for greater convenience.

As a matter of convenience in construction, it may be preferred to arrange the two delay lines $1a$, $11a$ in semicircular form as shown in Fig. 5, the taps $6a$, $16a$ being mounted at opposite ends of a rotating arm $7a$ which is pivoted at the center of both semicircles. With this construction, the input terminals $2a$, $12a$ of the two lines to which are connected the two generators $3a$, $13a$ may be located close together at one part of the apparatus while the two absorptive terminations $5a$, $15a$ are located close together elsewhere.

From what has been said, it is plain that, for any single location $d$ of the movable taps $6$, $16$ or $6a$, $16a$, that is to say for any value $\tau$ of the lag, the indicator $19$ or $19a$ gives the value of the cross correlation between the signals $f_1(t)$ and $f_2(t)$. Thus a continuous plot of the indicator readings as the taps are moved from one end of the lines to the other gives this cross correlation as a function of the lag $\tau$.

There is of course no restriction on $f_1(t)$ or $f_2(t)$. In particular, $f_2(t)$ may be equal to $f_1(t)$, in which case the apparatus of Fig. 1 or Fig. 5 indicates the autocorrelation of $f_1(t)$.

In the event that only the autocorrelation is desired, it is possible to effect further economies in the apparatus of Fig. 1 or Fig. 5. It will be recalled that in the description of Fig. 1, the signal applied to the input terminals after it has passed the movable tap is of no further interest. The terminating impedance is connected to the output terminals to prevent echoes from causing confusion with the desired signal. In accordance with a further feature of the invention, this residual portion of each of the delay lines, useless in Fig. 1, is turned to account in the fashion indicated in Fig. 6. Two like lines $41$, $51$ are provided which, however, are of one half the length of those of Fig. 1. They are provided, as before, with taps $46$, $56$ which are arranged to move in coordinated fashion from one end to the other. Now, however, the absorbing terminations have been removed and replaced, in the case of the upper line $41$, by an open-circuit termination $45$, and in the case of the lower line $51$ by a short-circuit termination $55$. As is well known, each such termination produces virtually complete reflection of a voltage wave reaching it, without change of phase in the case of the open-circuit termination $45$ and with phase reversal in the case of the short-circuit termination $55$. A generator $43$ of a voltage wave $f_1(t)$ is applied to the input terminals $42$, $52$ of the two lines in parallel. In operation this wave travels to the far end of the upper line $41$, is reflected, and travels back without change of phase to the input terminals $42$ where, to prevent a second trip, it is absorbed in an input terminating impedance element $44$ connected to the input terminals $42$. In doing so, it passes the movable tap $46$ twice, namely, a first time in the course of its left-to-right progress and a second time in the course of its right-to-left progress. Thus two derived signals appear at the tap $46$ and are picked off in succession. Their sum is given by $$e^{-\alpha d}f_1\left(t-\frac{d}{v}\right)+e^{-\alpha(l-d)}f_1\left(t-\frac{l-d}{v}\right) \quad (13)$$

Similarly, the same signal applied to the input terminals $52$ of the lower line $51$ travels to the short-circuit termination $55$ and returns after a reversal of phase to the input terminals $52$ where it is absorbed by the terminating impedance element $54$ connected to its input terminals. In so doing, it passes the tap $56$ twice, first in its progress from left to right and later after a reversal of phase in its progress from right to left. The sum of the two signals thus derived by the tap $56$ is therefore given, taking the phase reversal introduced by the short-circuit termination $55$ into account, by the expression $$e^{-\alpha d}f_1\left(t-\frac{d}{v}\right)-e^{-\alpha(l-d)}f_1\left(t-\frac{l-d}{v}\right) \quad (14)$$

With this arrangement, the two reflecting terminations $45$, $55$, one of which reverses phase while the other leaves it unchanged, perform the function of the adder $24$ and of the subtractor $25$ of Fig. 3, respectively.

In the case of the apparatus of Figs. 1 and 5, the balancing out of the variable attenuation factor was accomplished by the association in pairs of two propagation paths, the one being the portion, of length $d$, of the first line between its input point and the pickoff tap, and the other being the portion, of complementary length $l-d$, of the second line between its input point and the tap.

Figure 6:
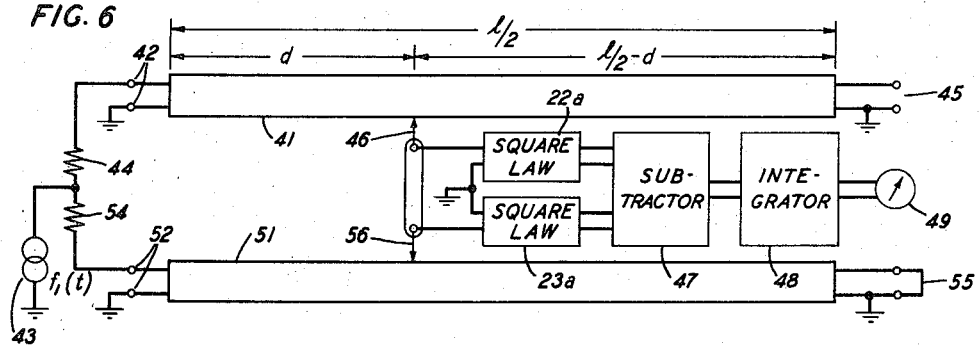
Fig. 6 is a schematic block diagram showing an autocorrelation computer in accordance with the invention.

In the case of the apparatus of Fig. 6, the same complementary relation holds between propagation paths. Now, however, the paths which are of complementary length are, for each line, the portion extending from the input point to the pickoff point directly, and the portion extending from the input point to the reflecting termination and back, after reflection, to the pickoff point.

Thus, while the structures differ, the common principle which underlies them is the association in pairs of two propagation paths in a fashion such that the two members of each such pair are of mutually complementary length.

To complete the computation of correlation the first sum signal (13) is applied to the input terminals of one square law device 22a and the second difference signal (14) is applied to the input terminals of a second square law device 23a. The outputs of these two devices, namely, the squared sum and the squared difference, are applied to the input terminals of a subtracter 47 which may be of any desired construction; e. g., that of Fig. 4 with the switch 30 in the "down" position.

The output of the subtracter 47, which is proportional to the required product, is applied to an integrator 48 as before whose output in turn is applied to an indicator 49 which then indicates, for any tap location $d$, i. e., for any lag $\tau$, the autocorrelation of the signal $f_1(t)$.

As a consequence of the two-way propagation which takes place in each of the lines of Fig. 6, the autocorrelation for any value of the lag $\tau$ is automatically computed and indicated with a pair of lines, each one-half the length of the lines of Figs. 1 and 5. Thus, the apparatus of Fig. 6 serves not only to balance out the undesired attenuation introduced by the single variable-length delay line of the prior art but does so by the employment of two lines, each one-half the length of the one prior art line, i. e., with no greater amount of retardation apparatus.

Figure 7:
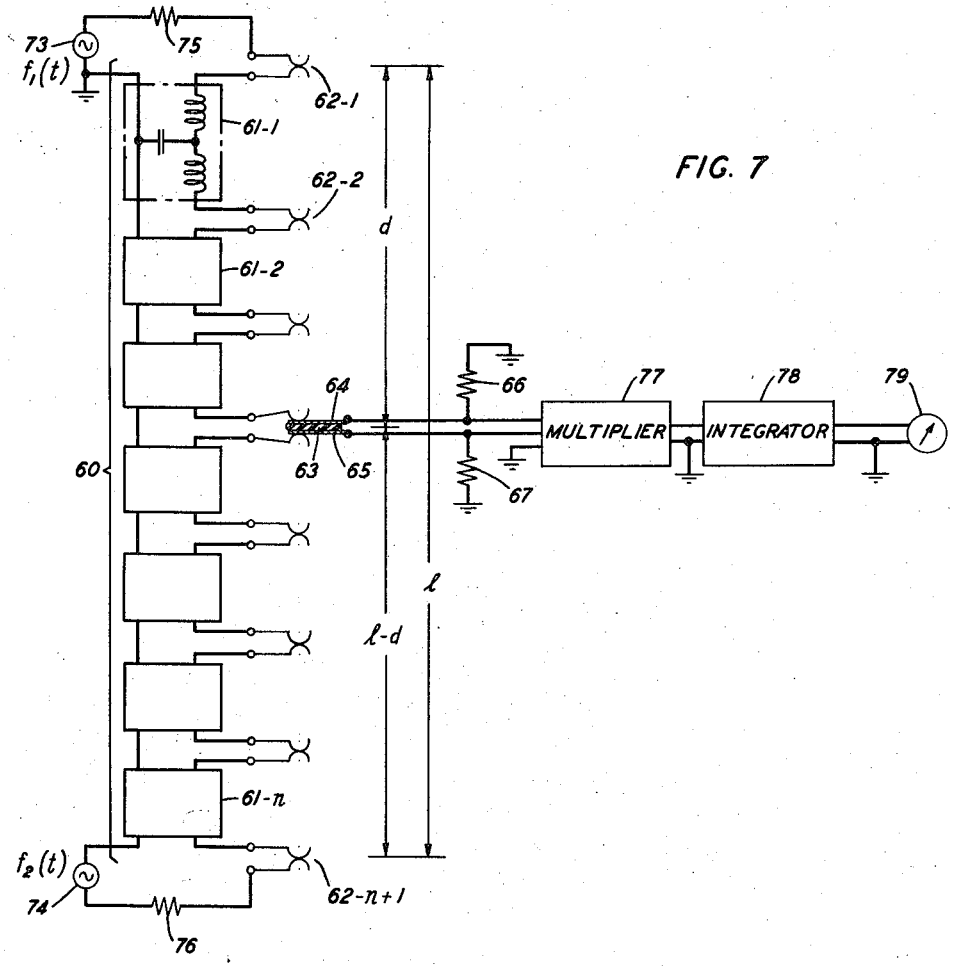
Fig. 7 shows a correlation computer adapted for either autocorrelation or cross correlation computation which embodies certain features of the system of Fig. 1 and certain other features of the system of Fig. 6.

In accordance with still another feature of the invention, this economy of apparatus may be realized in the computation of cross correlation as well as autocorrelation provided the retardation device or delay line is of the iterated lumped variety having couplings or connections between adjacent sections thereof which may be altered at will. Fig. 7 shows such a system. The delay line comprises a ladder network 60 of like sections 61–1, 61–2 . . . 61–$n$, each of which may comprise an inductance coil connected in series and a condenser connected in shunt, as indicated in the section 61–1. The interconnection between each section and its neighbors is established by spring contacts 62–1, 62–2 . . . 62–$n$+1 which are normally closed to establish a direct path for wave energy from each section to the next.

At one point of the sequence of sections a two-terminal plug 63 is inserted between the spring contacts 62, one terminal 64 of the plug 63 making contact with the section to the left of it and the other terminal 65 with the section to the right of it. The first plug terminal 64 is connected by way of a wave-absorbing resistance termination 66 to ground and the second plug terminal 65, insulated from the first, is similarly connected by way of another wave-absorbing impedance element 67 to ground. A first generator 73 is connected to the left-hand terminals of the first line section 61–1 and a second generator 74 is connected to the right-hand terminals of the last line section 61–$n$.

The plug terminals 64, 65 are connected to the input points of a multiplier 77 whose output supplies an integrator 78 whose output in turn is delivered to an indicator 79.

With the plug 63 in the location indicated, it is spaced from the upper generator 73 by the distance $d$ and, the length of the entire line being $l$, it is spaced from the lower generator 74 by the distance $l-d$. If the time function generated by the upper generator be denoted $f_1(t)$ as it is applied to the upper terminals of the first section, this time function is propagated from top to bottom along the line 60 as far as the plug 63 where it appears across the resistance termination 66. It does not pass this point to proceed over the lower portion of the line because the two portions are disconnected by the plug 63. Because of the retardation and attenuation which take place in the course of this propagation, the signal which appears across the upper terminating resistor 66 is proportional to the quantity $$e^{-\alpha d} f_1\left(t - \frac{d}{v}\right) \qquad (15)$$

where, as before, $v$ is the propagation speed of the wave along the line 60 and $\alpha$ the attenuation per unit length of line. Similarly, the function generated by the lower generator 74 being $f_2(t)$, it is propagated along the lower portion of the line from bottom to top, and appears across the lower terminating resistor 67 as $$e^{-\alpha(l-d)} f_2\left(t - \frac{l-d}{v}\right) \qquad (16)$$

and, because the line is opened by the plug 63, goes no farther.

As a precaution against the effects of imperfect impedance matching by the terminating resistors 66, 67 absorptive terminations 75, 76 are preferably connected to the end terminals of the line as well as to the plug.

The two signals given by Equations 15 and 16 are thus applied to the multiplier 77 which multiplies them together to form a signal proportional to their product. This in turn is integrated or averaged over a desired time $T$ by the integrator 78 and the average value of the output of this element is indicated by the indicator 79.

The product of the signals which appear across the plug terminating impedances 66, 67 is given by Equation 8 without change. The explanation hereinabove given with respect to operation of the apparatus of Fig. 1, including Equations 8 through 12, is applicable in its entirety to the system of Fig. 7. Hence it is plain that the reading $T$ by te integrator 78 and the average value of the output correlation of the signals $f_1(t)$ and $f_2(t)$.

No restriction is placed on the time function $f_2(t)$. In particular, it may be identical with the time function $f_1(t)$ in which case the indicator 79 measures its autocorrelation.

Figure 8:
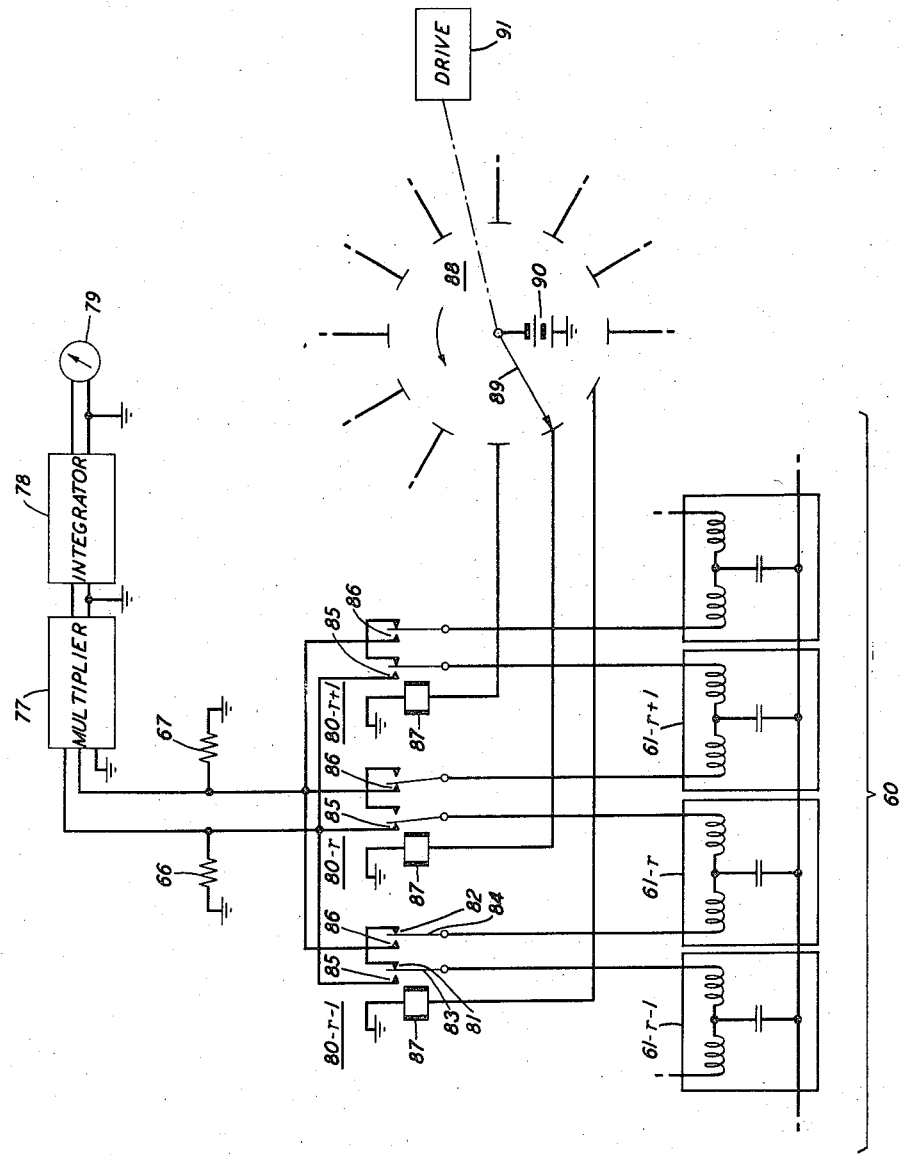
Fig. 8 is a partial schematic diagram of circuit details which may be employed for rapidly changing the location of the terminating elements of Fig. 7.

The system of Fig. 7 illustrates the principles by which the correlation is computed for each value of the lag $\tau$, i. e., for each position in the line 60 of the plug 63. If no great rapidity of repetition of such computations is required, the system of Fig. 7 may be operated manually without change. In many situations, however, it is desired to repeat such computations for different values of the lag $\tau$ with considerable rapidity, in which case the spring contacts 62 and the plug 63 may be replaced by any suitable apparatus, mechanical or electronic, which rapidly moves the point at which the two signals are picked off the line, advancing it successively from section to section and from one end of the line to the other. Fig. 8 shows suitable apparatus of one form. Here three adjacent sections 61 of the line 60 are indicated. The spring contacts between each section and its neighbors are replaced by 6-point relays 80. Of these, two fixed points 81, 82, against which the two moving points 83, 84 normally rest, are connected together in each case, thus to establish a direct connection between each section and its neighbors. Of the two other fixed points 85, 86, the upper ones 85 are all connected together and to one terminating resistor 66 and one input point of the multiplier 77, while the lower ones 86 are all connected together to the other terminating resistor 67 and to the other input point of the multiplier 77. One terminal of the energizing winding 87 of each of the several relays is connected to ground while the other is connected to one segment of a commutator 88 whose wiper arm 89 makes contact with these segments in succession in the course of its rotation. The wiper arm 89 is connected by way of a battery 90 to ground.

In operation, the wiper arm 89 is rotated as by a drive 91 at a speed such that it makes a single full revolution in the time $nT$, where $n$ is the number of sections 61 in the relay line 60, dwelling on each segment for the time $T$. The current of the battery 90 flows through the wiper arm 89 to one segment of the commutator 88, through the energizing coil 87 of one of the relays 80, to ground and back to the battery 90. This acts to hold the contacts of a single one of the relays in the "up" position, leaving all others in their "down" positions. Thus every section of the line is connected to both of its neighbors except in the single case of the relay 61–$r$ which is located at the distance $d$ from the upper end of the line 60 and the distance $l-d$ from the lower end. In this one case only, the upper portion of the line is connected to its terminating resistor 66 and to one input point of the multiplier 77 while the lower portion of the line is connected to its terminating resistor 67 and the other input point of the multiplier 77.

The mechanical relays and the commutator of Fig. 8 serve well to illustrate the principles by which the termination point can be advanced from end to end of the line 60 with considerable rapidity. If, as in many cases of interest, it is desired that this advance be made with the greatest possible rapidity, electronic counterparts of the relays and the commutator may readily be substituted for these elements.

What is claimed is:

1. Apparatus for computing the correlation of two signals $f_1(t)$ and $f_2(t)$ which comprises two delay lines having like propagation characteristics, each of said lines having an input point and an energy pickoff point, a connection for applying the signal $f_1(t)$ to the input point of one line to be propagated along said line, a connection for applying the signal $f_2(t)$ to the input point of the other line to be propagated along said other line, the length of each line from its input point to its pickoff point having a preassigned relation to that of the other line such that the paths over which said signals are propagated are associated in pairs, the two members of each such pair being mutually complementary with respect to a fixed length, a tap located at the pickoff point of each line for deriving a secondary signal related to the signal applied to said line as propagated over said line to said tap, means for combining the two secondary signals thus derived, means for integrating said combined signals over a time T, which is long compared with the signal propagation time over either of said lines means for indicating the magnitude of the integral, and means for moving the location of the pickoff point of each line along it in a fashion to maintain said preassigned line-length relation.

2. Apparatus as defined in claim 1 wherein the length of each line from its input point to its pickoff point is complementary to that of the other line.

3. Apparatus as defined in claim 1 wherein each of said lines is provided at the end remote from its input point with a nonreflective termination.

4. Apparatus as defined in claim 1 wherein the secondary signal is derived at the tap of each line by virtue of a single passage of the signal applied to said line past said tap in one direction.

5. Apparatus as defined in claim 1 wherein the derived-signal-combining means comprises a multiplier.

6. Apparatus as defined in claim 1 wherein the length of each line from its input point to its pickoff point is equal to that of the other line.

7. Apparatus as defined in claim 1 wherein one of said lines is provided at the end remote from its input point with a termination adapted to reflect incident energy without phase reversal and the other of said lines is provided at the end remote from its input point with a termination adapted to reflect incident wave energy with a reversal of its phase.

8. Apparatus as defined in claim 7 wherein said first-named termination is an open circuit and said second-named termination is a short circuit.

9. Apparatus as defined in claim 1 wherein the secondary signal derived at the tap of each line comprises two portions, one of which is derived by virtue of a first passage of the signal applied to said line past said tap in one direction and the other of which is derived by virtue of the second passage of the signal applied to said line past said tap in the opposite direction.

10. Apparatus as defined in claim 7 wherein the derived signal-combining means comprises means for individually squaring the two derived signals and means for subtracting one of said squares from the other.

11. Apparatus for computing the correlation of two signals $f_1(t)$ and $f_2(t)$ which comprises two similar delay lines, each having an input terminal and an output terminal, a nonreflective impedance termination connected to the output terminal of each line, a connection for applying the signal $f_1$ to the input terminal of one line, a connection for applying the signal $f_2$ to the input terminal of the other line, each of said lines having a pick-off tap making contact therewith and movable lengthwise thereof, the length of each line between its input terminal and its pick-off tap being thus its effective length, means for moving said taps in coordinate relation with the input terminals of said lines in a fashion to hold constant the sum of said two effective lengths, means for applying energy of both pick-off taps to a multiplier, means for integrating the output of said multiplier over a time T which is long compared with the signal propagation time over either of said lines, and means for indicating the magnitude of the integral.

12. Apparatus as defined in claim 11, wherein said lines are disposed side by side, the input terminals of each line being adjacent to the output terminals of the other line, and wherein the tap-moving means operates to move said taps toward the output terminals of one line and toward the input terminals of the other line.

13. In combination with apparatus as defined in claim 11 wherein each line has substantially the form of a semicircle and wherein said lines are disposed substantially on the circumference of a circle, the input terminals of said lines being located at one end of a diameter of said circle, the output terminals of said lines being located at the other end of said diameter, a pivot disposed at the center of said circle, and an insulating arm rotatably mounted on said pivot, said taps being mounted at opposite ends of said arm.

14. Apparatus for computing the autocorrelation of a signal $f(t)$ which comprises two like delay lines, each having an input terminal and output terminals, a nonreflective impedance terminal connected to the input terminal of each line, the output terminals of one line being short-circuited, the output terminals of the other line being open-circuited, connections for applying the signal $f(t)$ to the input terminals of both of said lines together, each of said lines having a pick-off tap making contact therewith and movable lengthwise thereof, means for moving said taps together from the input terminals of said lines to the output terminals of said lines in a fashion such that the separation along each line between its input terminal and its tap is equal to the separation along the other line between its input terminal and its tap, means for individually squaring the outputs of the pick-off taps to form squares, means for subtracting one square from the other square to form a difference, means for integrating said difference over a time T which is long compared with the signal propagation time over either of said lines, and means for indicating the magnitude of the integral.

15. Apparatus for computing the correlation of two signals $f_1(t)$ and $f_2(t)$ which comprises a ladder structure of $n$ like reactive circuit sections, each of said sections having series inductance and shunt capacitance, and having left-hand terminals and right-hand terminals, connections for applying the signal $f_1(t)$ to the left-hand terminals of the first section, connections for applying the signal $f_2(t)$ to the right-hand terminals of the $n$th section, means normally establishing a low impedance tandem connection from each of the first $r-1$ sections to the following section, $r$ being a whole number which may assume any value from $l$ to $n-1$ inclusive, means normally establishing a low impedance connection from each of the last $n-r-1$ sections to the preceding section, a first nonreflective impedance termination connected to the right-hand terminals of the $r$th section, a second nonreflective impedance termination connected to the left-hand terminals of the $(r+l)^{\text{th}}$ section, means for deriving a secondary signal from each of said terminations, means for multiplying said secondary signals to form a product, means for integrating said product over a time T which is long compared with the signal propagation time over said ladder structure, means for indicating the magnitude of the integral, and means for increasing the value of $r$ in integral steps from $l$ to $n-l$, thereby shifting the location of said terminations along said ladder structure.

16. Apparatus for computing the correlation of two signals $f_1(t)$ and $f_2(t)$ which comprises two delay lines having like propagation characteristics, each of said lines having an input point and an energy pick-off point, the length of each line from its input point to its pick-off point being thus its effective length, said pick-off points being so located that the sum of said effective lengths is equal to the full length of either line, a connection for applying the signal $f_1(t)$ to the input point of one line, a connection for applying the signal $f_2(t)$ to the input point of the other line, means located at the pick-off point of each line for deriving a secondary signal related to the signal applied to said line as propagated over said line, means for multiplying the two secondary signals thus derived to form a product, means for integrating said product over a time T which is long compared with the signal propagation time over either of said lines, and means for indicating the magnitude of the integral.

References Cited in the file of this patent

UNITED STATES PATENTS

| | | |
|---|---|---|
| 2,166,991 | Guanella | July 25, 1939 |
| 2,643,819 | Lee et al. | June 30, 1953 |
| 2,658,189 | Lovell | Nov. 3, 1953 |

FOREIGN PATENTS

| | | |
|---|---|---|
| 1,032,674 | France | Apr. 1, 1953 |

OTHER REFERENCES

Cheatham: "Electronic Correlator for Solving Complex Signalling Parameters," Tele-Tech., February 1950, pages 40–43.

Electronic Analog Computers (Korn and Korn), published by McGraw-Hill Book Co., New York, 1952, page 214.

UNITED STATES PATENT OFFICE
Certificate of Correction

Patent No. 2,854,191                              September 30, 1958

Gordon Raisbeck

It is hereby certified that error appears in the printed specification of the above numbered patent requiring correction and that the said Letters Patent should read as corrected below.

Column 10, line 68, claim 15, for "$r-l$" read $r-1$; line 70, for "$l$ to $n-l$" read $1$ to $n-1$; line 72, for "$n-r-l$" read $n-r-1$; column 11, line 1, for "$(r+l)^{th}$" read $(r+1)^{th}$; line 8, for "$l$ to $n-l$," read $1$ to $n-1$,.

Signed and sealed this 13th day of January 1959.

[SEAL]

Attest:
KARL H. AXLINE,
*Attesting Officer.*

ROBERT C. WATSON,
                                         *Commissioner of Patents.*